United States Patent [19]

Honsho et al.

[11] Patent Number: 4,600,375
[45] Date of Patent: Jul. 15, 1986

[54] INJECTION APPARATUS INCLUDING MEANS FOR FEEDING SOLID RESIN TO AN INJECTION MEANS AND RADIANT HEATING MEANS TO MELT THE RESIN

[75] Inventors: Norihisa Honsho, Yokohama; Kazuhiro Mori, Katano, both of Japan

[73] Assignee: Matsushita Electric Industrial Co., Ltd., Osaka, Japan

[21] Appl. No.: 601,160

[22] Filed: Apr. 17, 1984

[30] Foreign Application Priority Data

| Apr. 18, 1983 [JP] | Japan | 58-68697 |
| May 25, 1983 [JP] | Japan | 58-92806 |
| Jun. 2, 1983 [JP] | Japan | 58-96962 |
| Jun. 9, 1983 [JP] | Japan | 58-101754 |

[51] Int. Cl.⁴ .............. B29C 39/38; B29C 45/13; B29C 45/74
[52] U.S. Cl. .............. 425/174.4; 425/547; 425/562; 425/585
[58] Field of Search .............. 425/174.4, DIG. 13, 425/542, 547, 562, 585

[56] References Cited

U.S. PATENT DOCUMENTS

| 2,207,426 | 7/1940 | Bailey | 264/25 |
| 2,534,988 | 12/1950 | Purcell | 264/25 |
| 2,893,055 | 7/1959 | Wenzel | 264/DIG. 46 |
| 2,950,501 | 8/1960 | Harkenrider | 425/557 |
| 3,251,911 | 5/1966 | Hansen | 264/25 |
| 3,512,214 | 5/1970 | Shiba et al. | 425/174 |
| 3,761,550 | 9/1973 | Seefluth | 264/25 |

Primary Examiner—Willard E. Hoag
Attorney, Agent, or Firm—Wenderoth, Lind & Ponack

[57] ABSTRACT

The injection machine according to the present invention has an infrared ray heater disposed outside a transparent glass tube cylinder a reflector disposed outside the infrared ray heater, an injection cylinder to which the glass tube cylinder is coupled by way of a change-over valve, a transfer mechanism to transfer the resin material from the glass tube cylinder into the injection cylinder, and an injection plunger in the injection cylinder to inject the molten resin. Since an infrared ray heater is used for the purpose of melting the resin material, a desired temperature can be achieved in a few minutes, and the forming may be started in a short time.

5 Claims, 7 Drawing Figures

INJECTION APPARATUS INCLUDING MEANS FOR FEEDING SOLID RESIN TO AN INJECTION MEANS AND RADIANT HEATING MEANS TO MELT THE RESIN

FIELD OF THE INVENTION

This invention relates to an injection machine for injecting resin into, for example, a mold and is intended to provide an injection machine capable of melting the material in a short time and enhancing the performance and reliability.

BACKGROUND OF THE INVENTION

In a conventional injection machine, as shown in FIG. 1 for example, a screw 1 is rotated through reduction gear 5 rotated by a motor 4 in order to melt and inject the plastic material from a hopper 6.

The material supplied from the hopper 6 into a cylinder 2 is plasticized by the shearing heat from the rotation of the screw 1 and the heating from an external heater 7, and is accumulated in the cylinder 2. The plasticized molten material is injected by the advancing motion of the screw 1 through the operation of an injection cylinder 3.

In such conventional example, since the heater temperature elevation takes a long time, power must be supplied to the heater 7 about 20 to 30 minutes before start of injection, which is often a serious disadvantage in interlocked or synchronized operation between a forming machine and an assembly line.

DISCLOSURE OF THE INVENTION

The injection machine according to the present invention comprises an infrared ray heater disposed on the outside of a transparent glass tube cylinder, a reflector disposed on the outside of the infrared ray heater, an injection cylinder to which the glass tube cylinder is coupled by way of a changeover valve, a transfer means to transfer the resin material from the glass tube cylinder into the injection cylinder, and an injection plunger to inject the molten resin from within the injection cylinder, in which a specified temperature may be achieved in only a few minutes because the infrared ray heater is used for melting the resin material, so that forming may be started in a short time.

DESCRIPTION OF THE PREFERRED EMBODIMENTS

Figure 1:
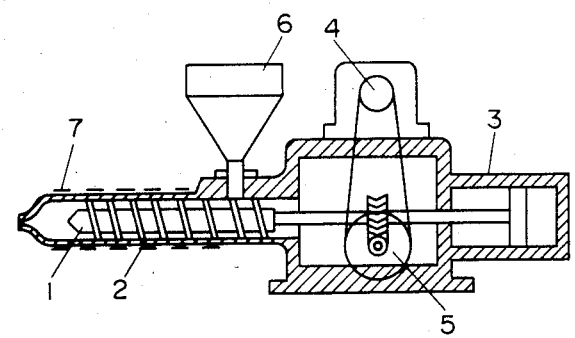
FIG. 1 is a sectional view of a conventional inline screw type injection machine.
Figure 2:
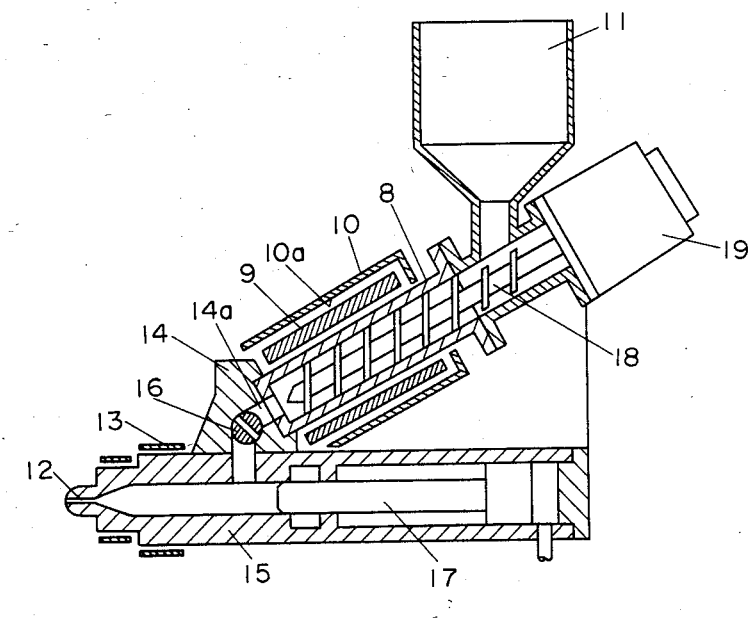
FIG. 2 is a sectional view of a first embodiment of the present invention.
Figure 3:
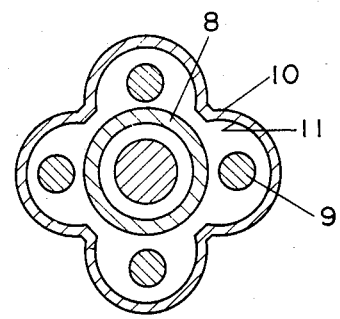
FIG. 3 is an enlarged transverse sectional view of the melting unit of the machine.

A first embodiment of the present invention is described below by referring to FIG. 2. In the drawing, numeral 8 denotes a transparent glass tube cylinder, and 9 is a infrared ray lamp comprised of an infrared ray heater disposed outside the cylinder 8, and a reflector 10a for reflecting all of the light of this infrared ray lamp 9 toward the glass tube cylinder 8 is arranged inside of a water jacket 10 for cooling the reflector. There is a connecting block 14, which has a flow passage 14a for molten resin in its central part connecting the glass tube cylinder 8 and an injection cylinder 15. A changeover valve 16 closes when injecting or melting the material, and opens when a plunger 17 of the injection cylinder 15 retreats. Numeral 18 represents rotary blades provided in the glass tube cylinder 8, which are rotated and driven by a motor 19 and which constitute a transfer means to transfer the resin in the glass tube cylinder 8 into the injection cylinder 15. Numeral 11 designates a hopper for feeding the forming material into the glass tube cylinder 8. There are also a nozzle 12 for injection and a band heater 13 for insulation.

In this construction, the operating sequence of one cycle is as follows. By rotating the rotary blades 18 by means of motor 19, the resin material in the hopper 11 is transferred into the glass tube cylinder 8. Then the resin material is heated and melted by the infrared ray lamp 9, and by opening the changeover valve 16 in the connecting block 14, the molten resin is sent into the injection cylinder 15. Next, the changeover valve 16 is closed and the plunger 17 of the injection cylinder 15 is advanced, so that the molten resin is injected through the nozzle 12.

Thus, in this embodiment, since the resin material is melted by using the infrared ray lamp from the outside of the glass tube cylinder 8, the melting time is shorter as compared with that of the conventional screw or band heater system, and the heater disconnection accidents are less. Besides, since the injection cylinder 15 and material melting cylinder are separately provided, high injection pressure is not transmitted to the glass tube, so that a high reliability is obtained with respect to the strength.

In addition, by installing rotary blades 18 inside the glass tube cylinder 8, deposit of molten resin on the inner wall of glass tube cylinder 8 is prevented, and the plasticizing efficiency is raised. Furthermore, since the rotary blades 18 are provided in the central part, the material in the glass tube cylinder is collected near the tube wall, and it is effective to further increase the melting effect, so that the material after melting may be homogenized by mixing.

Figure 4:
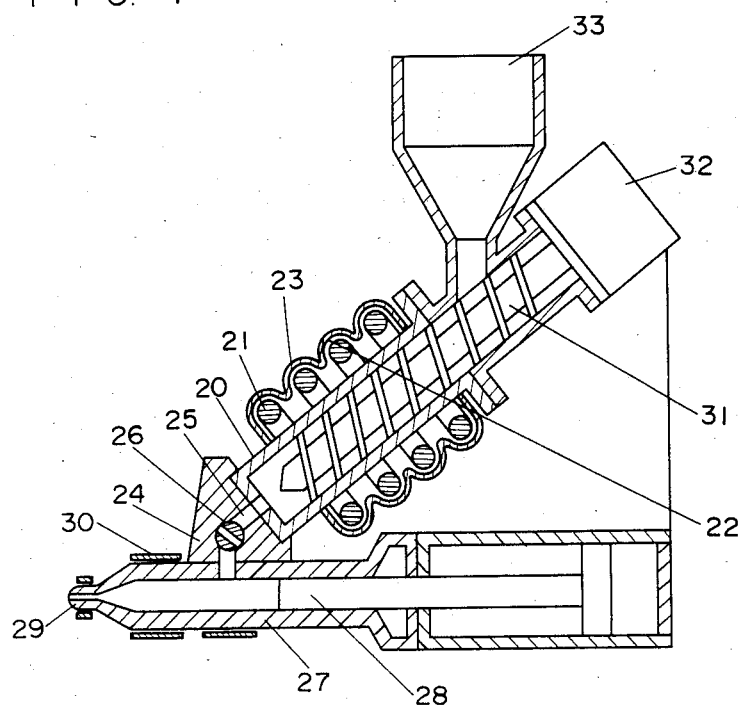
FIG. 4 is a sectional view of an injection machine according to a second embodiment of the present invention.

A second embodiment of the present invention is described below by referring to FIG. 4. In the drawing, numeral 20 is a transparent glass tube cylinder, and 21 is a ring-shaped infrared ray lamp disposed outside the glass tube cylinder, constituting an infrared ray heater. A reflector 22 for reflecting all of the light of this infrared ray lamp 21 in the direction of the glass tube cylinder 20 is disposed inside of a water jacket 23 for cooling the reflector. There are also a connecting block 24, flow passage 25, changeover valve 26 for opening and closing this flow passage 25, injection cylinder 27, plunger 28, injection nozzle 29, and band heater 30. Numeral 31 denotes rotary blades, 32 designates a drive motor, therefore and 33 a hopper for resin feed.

In this construction, as compared with the first embodiment, since the ring-shaped infrared ray lamp 21 is used as the infrared ray heater, it is possible to control the temperature distribution in the axial direction of glass tube cylinder 20 in steps, which is advantageous in a precise forming process.

Figure 5:
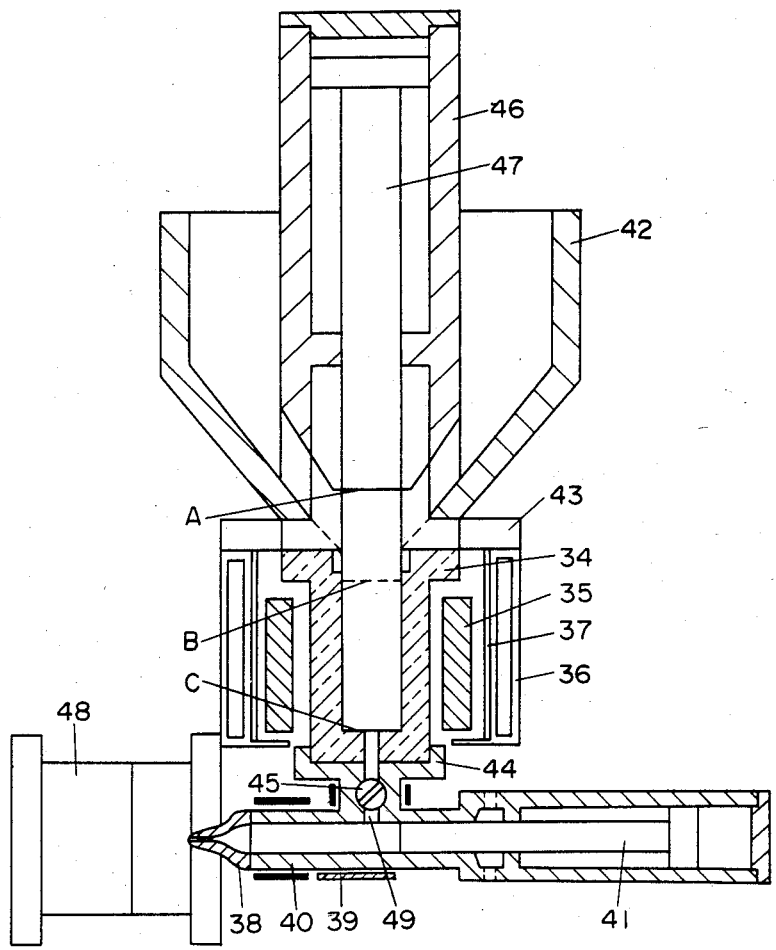
FIG. 5 is a sectional view of an injection machine according to a third embodiment of the present invention.

FIG. 5 shows a third embodiment of the present invention, in which numeral 34 designates a transparent glass cylinder, 35 designates an infrared ray lamp provided around the glass cylinder 34, 37 designates a reflector to reflect the light of the infrared ray lamp, 36 designates a water jacket, 44 designates a flange connecting the glass cylinder 34 and injection cylinder 40, and a flow passage 49 and a changeover valve 45 to open and close the flow passage are provided in its center. Numeral 41 designates a plunger for injection, 46 designates a cylinder for feed, 47 designates a plunger for feed, 43 designates an auxiliary plate, 42 designates a hopper provided coaxially with the feed cylinder, 39 designates a heater for insulation, 38 designates a nozzle, and 48 designates a mold. In this construction, since the cylinder for feed 46 and the hopper 42 are coaxial, the downward flow of material is stabilized, and the structure is simplified.

Figure 6:
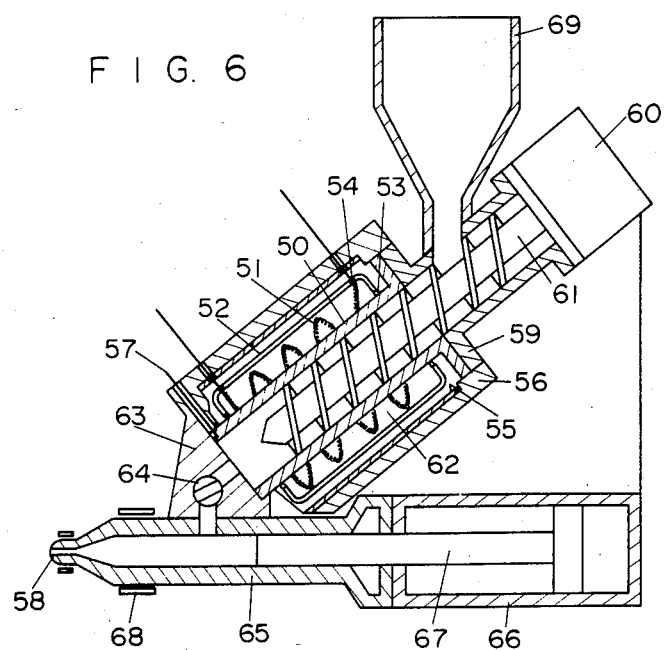
FIG. 6 is a sectional view of an injection machine according to another embodiment of the present invention.

FIG. 6 shows another embodiment of the present invention, in which numeral 50 designates an inner tube made of transparent glass, 51 designates a filament made of tungsten or the like disposed in a coil form outside this inner tube 50, and 52 designates an outer tube made of transparent glass to cover the outside of the filament 51. The two ends of the outer tube 52 are welded to the inner tube 50 by way of sealing material 53, and the space 62 between the two is kept at a vacuum or filled with nitrogen or other inert gas so as to be isolated from the air. The filament 51 is held so as not to contact with the inner tube 50 and outer tube 52, and its leads are sealed with sealing material 54. The infrared ray lamp is thus constructed. Numeral 55 designates a reflector surrounding the infrared ray lamp, being provided inside of a coupling plate 56, and it directs all light emitted by the infrared ray lamp toward the inside. On the back side, there is a cooling water passage (not shown). The material heating cylinder is composed of the infrared ray lamp and reflector. One end of the inner tube 50 is supported by a metallic flange 63, and the other by a bed frame 59, and rotary blades 61 for transferring the material are placed in the central axial part. The rotary blades 61 are coupled with a motor 60. Numeral 57 denotes a thermocouple for temperature control, and it is buried close as to the inner wall of the flange 63 and inner tube 50.

There is an injection cylinder 65 having an injection nozzle 58 at the end, and it is coupled with the material heating cylinder by means of changeover valve 64. Numeral 67 designates a plunger which is driven by drive cylinder 66 and moves linearly within the injection cylinder 65, 68 designates a heater for insulation, and 69 designates a hopper.

In this construction, since the heater is enclosed with inert gas or held in a vacuum, the heater life is long.

Figure 7:
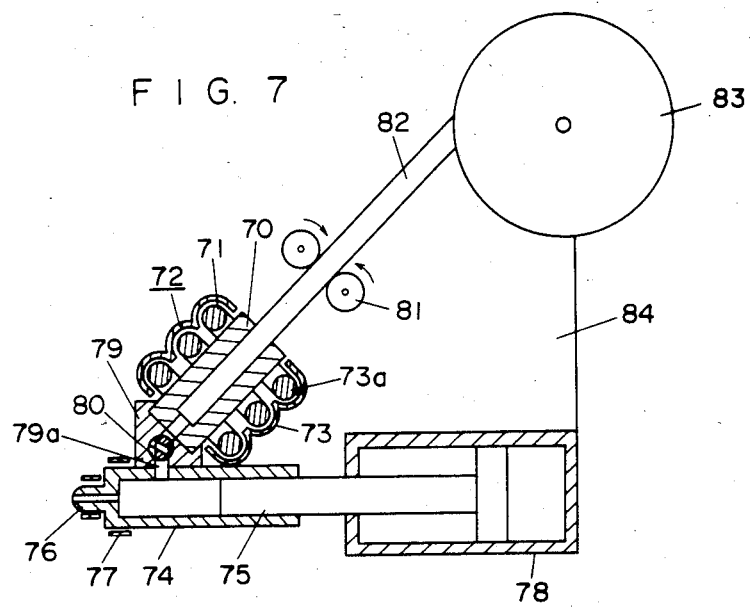
FIG. 7 is a sectional view of an injection machine according to one other embodiment of the present invention.

FIG. 7 shows one other embodiment of the present invention, in which numeral 70 designates a transparent glass tube cylinder, 71 designates a ring shaped infrared ray lamp which is an infrared ray heater, being disposed concentrically on the outside of the glass tube cylinder 70, and they are combined to make up a melting tube 72. A reflector 73a for reflecting all of the light of this infrared ray lamp 71 in the direction of the glass tube cylinder 70 is disposed inside a water jacket 73 for cooling the reflector. Numeral 74 designates an injection cylinder, and there is an injection plunger 75 in its inside, and its end is equipped with injection nozzle 76 and heater for insulation 77. Numeral 78 designates a drive cylinder for injection plunger 75. There is a connecting block 79 provided as the coupling part, the central part of which has a flow passage 79a therethrough for molten material. A changeover valve 80 closes when injecting, and opens when melting the material or transferring the molten material in the cylinder 70 into the injection cylinder 74. Numeral 81 designates a feed roller as the material transfer unit to send the resin forming material 82 in linear or belt form in the axial direction into the melting tube 72, and 83 is a bobbin on which the resin forming material 82 is wound. There is an auxiliary plate 84, on which bobbin 83, feed roller 81 and water jacket 73 are mounted. Thus, the molten resin forming material sent into the injection cylinder 74 is injected through the injection nozzle 76 by the plunger 75 of injection cylinder 74, and is formed in a mold (not shown).

In this construction, a feed plunger or rotary blades are not necessary, and the structure is simplified. Besides, since the resin material is continuously supplied into the melting tube, entry of air may be easily avoided.

EFFECTS OF THE INVENTION

As disclosed herein, since the present invention is intended to melt the material from the outside of glass tube cylinder by using an infrared ray heater, the forming material melting time is shorter as compared with that of the conventional screw or band heater system, and the operation start-up time can be shortened. Besides, heater disconnection accidents are fewer, and since the injection cylinder and material melting cylinder are installed separately, a high injection pressure is not applied to the glass tube, so that a high reliability may be obtained from the standpoint of the strength.

What is claimed is:

1. A resin injection machine comprising:
   a transparent glass tube having one end open;
   an infrared ray heater around the outside of said glass tube;
   a material feed means for feeding a one-piece elongated body of meltable resin material in the direction of its length and axially of said glass tube into said open end of said tube;
   an injection cylinder coupled to the other end of said glass tube; and
   a changeover valve connected between the other end of said glass tube and said injection cylinder for controlling the movement of resin from the glass tube into the injection cylinder, whereby the infrared heater melts the resin material as it is fed into said glass tube and the further feeding of resin material is without stirring the molten resin, thereby avoiding entry of air into the molten resin.

2. A resin injection machine as claimed in claim 1 wherein the cross-sectional shape of the interior of said glass tube is approximately the same as the cross-sectional shape of said body of resin material.

3. A resin injection machine as claimed in claim 1 wherein said material feed part comprises a bobbin on which the elongated body of resin material is wound, and a feed roller means between said bobbin and said glass tube for feeding the resin material axially of said glass tube.

4. A resin injection machine as claimed in claim 1 wherein said infrared ray heater is a ring-shaped infrared ray lamp.

5. A resin injection machine as claimed in claim 1 further comprising a reflector around the outside of said infrared ray heater.

* * * * *